April 25, 1967 S. G. FISHER 3,315,408
SOLUBLE FIBROUS MATERIAL FOR CONTROLLING SOIL EROSION
Filed March 22, 1965 2 Sheets-Sheet 2
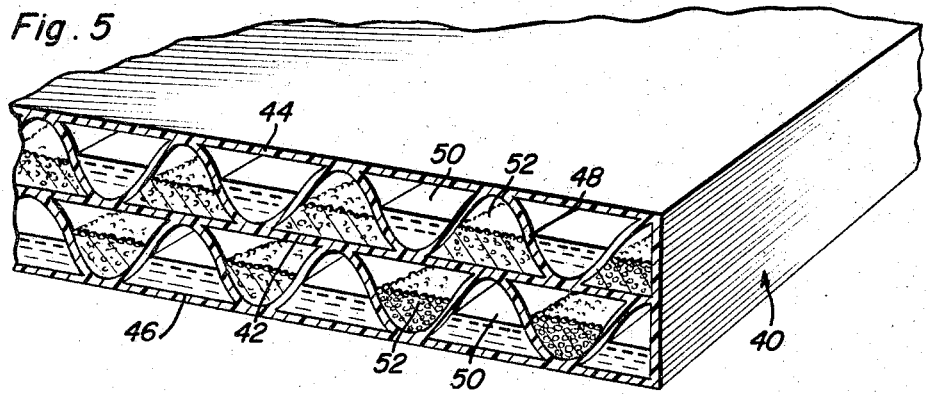
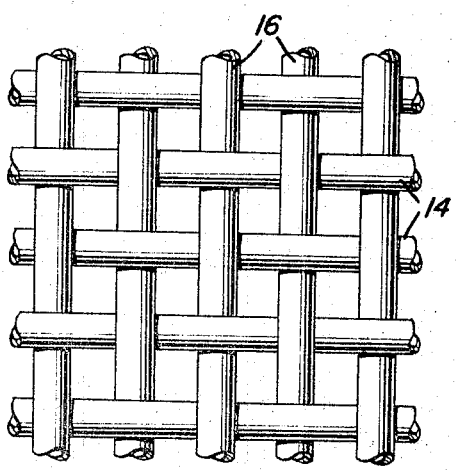
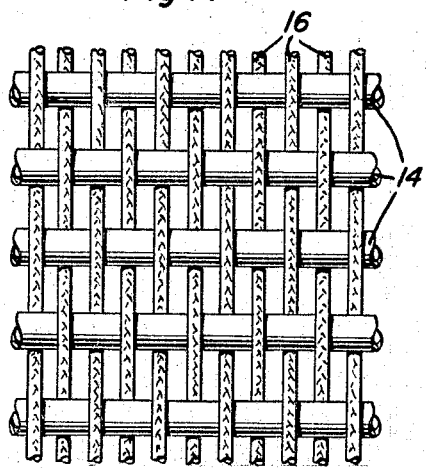
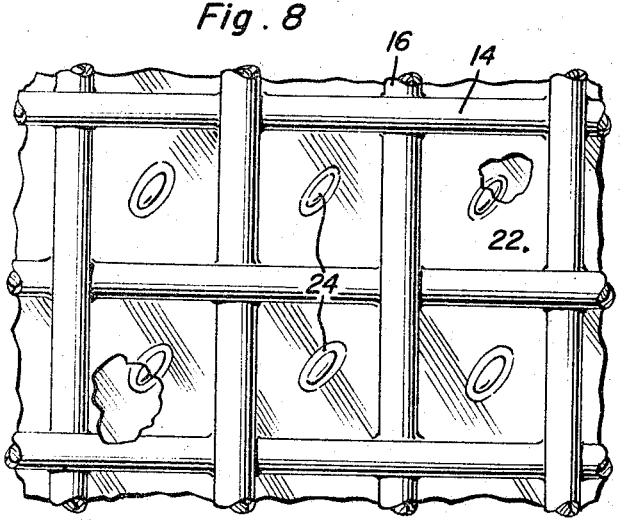
Sidney G. Fisher
INVENTOR.

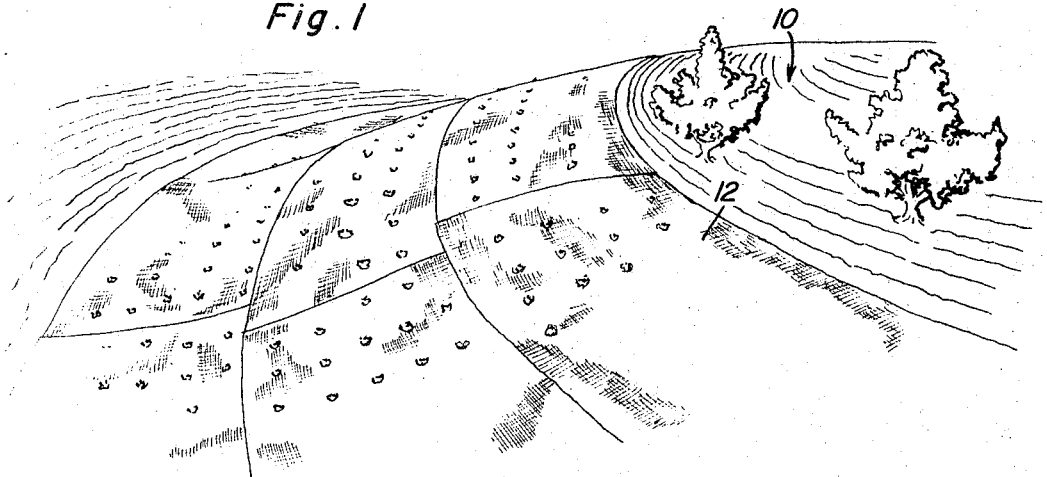
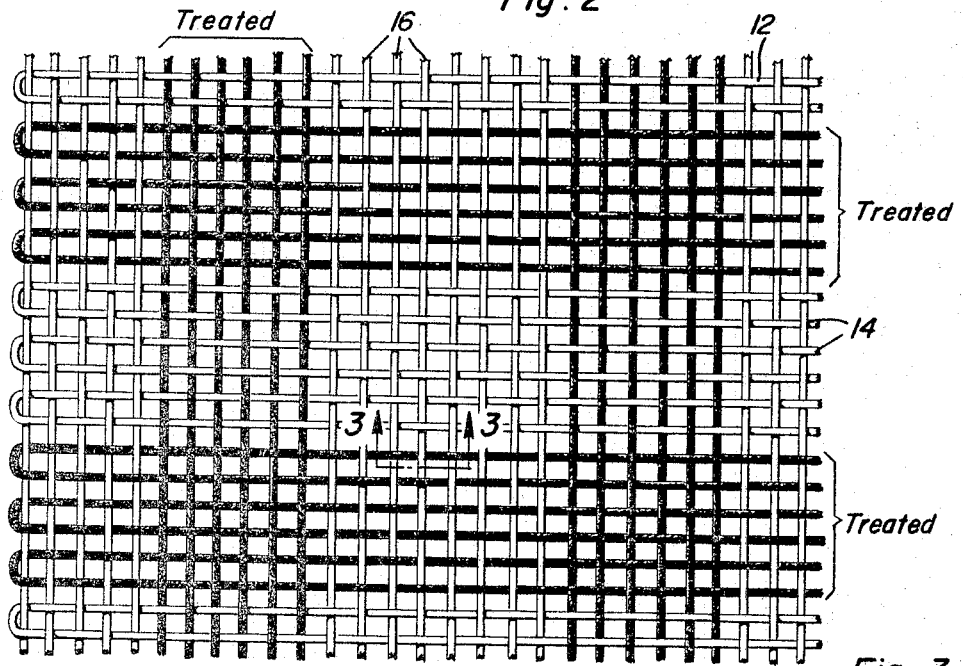
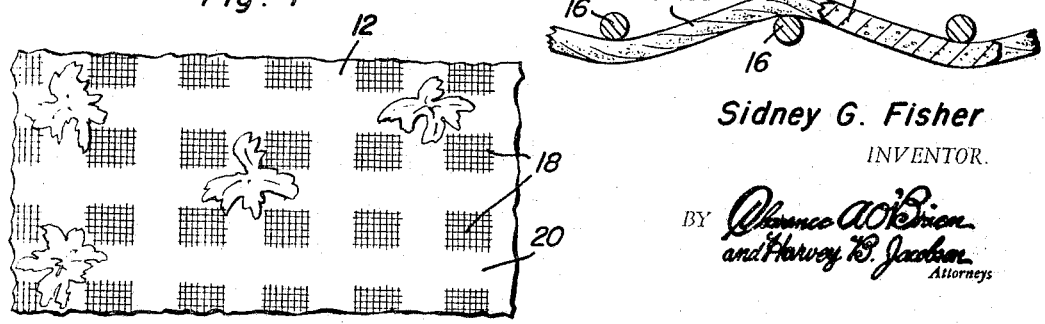
Sidney G. Fisher
INVENTOR.

United States Patent Office 3,315,408
Patented Apr. 25, 1967

3,315,408
SOLUBLE FIBROUS MATERIAL FOR
CONTROLLING SOIL EROSION
Sidney G. Fisher, 38 Riverside Drive,
Charleston, S.C. 29403
Filed Mar. 22, 1965, Ser. No. 441,776
5 Claims. (Cl. 47—9)

This invention comprises a novel and useful soluble fibrous material for controlling soil erosion and more particularly pertains to an article which will prevent or eliminate soil erosion by providing a disintegratable covering over areas subject to soil erosion and which have been seeded and which will provide a protection against erosion for these areas until erosion preventing vegetation has germinated beneath the protective covering.

There have been known heretofore erosion protecting means in the form of protective mats or coverings for areas subject to erosion and which are of a water soluble or weathering material such that after a predetermined period of exposure to weathering the protective cover will disintegrate. The purpose of such devices is to provide a protective covering for the soil during the period in which erosion preventing vegetation is germinating and growing and until the latter is of such size as to be able in itself to protect the area from erosion.

The present invention comprises an improvement over prior practice in that it greatly facilitates the seeding and germination of erosion preventing vegetation while providing during the pre-growth period of the vegetation a protective covering against erosion which is soluble by a biochemical reaction caused by microorganisms in the ground when the covering is placed on the group in contact with the soil at predetermined rates and under predetermined conditions.

It is therefore the primary object of this invention to provide a means for preventing or retarding soil erosion through the provision of a protective covering of a predetermined or controllable solubility for areas or regions subject to soil erosion and to cause the protective covering to dissolve or disintegrate in full or preselected portions thereof during the normal period of weathering or at a predetermined time to permit the growth therethrough of erosion preventing vegetation germinating beneath said protective covering.

Another important object of the invention is to provide an erosion protective covering for the soil of a material having a controllable or predetermined rate or time for disintegration under various agents including in particular a biochemical reaction caused by enzymatic action of microorganisms such as soil bacteria, when the covering is placed on the ground in contact with the soil.

An additional object is to provide a material in accordance with the foregoing object which shall consist of filaments, fibers or yarn of soluble cellulosic derivative material, either dissembled or assembled and applied loosely to the earth to form a covering or woven or otherwise incorporated into mats, blankets or textile fabrics.

A further object of the invention in accordance with the preceding object is to insure and facilitate the germination and growth of erosion preventing vegetation by enclosing in chambers within the protective covering, fertilizer, weed killers and/or other soil treating agents adapted to be successfully and/or simultaneously released by the disintegration of the portion of the covering in which they are confined.

Still another object of the invention pursuant to the foregoing object is to provide a covering having areas or portions thereof which have different rates of solubility by the action of disintegrating agents whereby to destroy the covering effect of such different areas at different time intervals to thereby progressively decrease the covering action as plant germination and growth develops.

Yet another object is to provide a covering in accordance with the foregoing objects which may embody a woven or textile fabric having therein tubular and/or solid yarns in various patterns and which have a controlled solubility and rate of disintegration.

A still further object of the invention is to provide a covering in compliance with the preceding objects which may constitute a mat of a soluble material having holders molded therein which are disposed in one or more overlying layers requiring different periods of disintegration time for dissolving and with fertilizers, weed killers and/or other soil treating agents confined in such chambers for release and effectiveness after a predetermined interval has occurred.

Still another important object in conformity with the foregoing objects is to provide a disintegratable erosion protective covering which shall include chambers therein with various soil or vegetation treating agents together with a controlled time or period for disintegration of the covering and release of the agents therein.

These together with other objects and advantages which will become subseqeuntly apparent reside in the details of construction and operation as more fully hereinafter described and claimed, reference being had to the accompanying drawings forming a part hereof, wherein like numerals refer to like parts throughout, and in which:

FIGURE 1 is a diagrammatic view illustarting one manner of applying the principles of this invention as a soil erosion preventive;

FIGURE 2 is a plan view, considerably enlarged, of a woven textile fabric mat embodying therein this invention;

FIGURE 3 is a detailed view taken in vertical section upon an enlarged scale and substantially upon the plane indicated by section line 3—3 of FIGURE 2;

FIGURE 4 is a fragmentary enlarged view of a portion of the arrangement of FIGURE 1;

FIGURE 5 is a perspective detail view of a modified construction of a soil erosion mat consisting of a molded, water soluble plastic;

FIGURE 6 is a fragmentary plan view of another modification of the invention;

FIGURE 7 is a fragmentary plan view of still another form of the invention; and

FIGURE 8 is a fragmentary plan view similar to FIGURE 4 but of yet another modified embodiment.

Basically, this invention involves the use of a covering to be placed over a soil area which is subject to and which is to be protected from erosion. The term covering as employed hereinafter in this application and within the purview of this invention is intended to include and comprehend all types of interengaged or interconnected filaments, yarns, fibers and the like which will sufficiently cohere to form a substantially continuous blanket or covering. In particular, the covering of this invention envisions the assembling of the yarns, filaments, fibers and the like as by means of weaving into a textile fabric. It also embraces within its scope, however, other manners of associating and assembling yarns, filaments, fibers and the like into a loose or compactly associated mass. A very important feature of the invention is that it enables any of the conventional weaves to be employed in the forming of a woven textile fabric. However, the yarns, filaments and the like can also be interlaced, twisted, knitted, braided, wattled or associated together in any desired manner so as to form a blanket or fabric-like structure capable of covering and protecting from weather and the like and thus preventing erosion effects upon soil.

A further essential feature of the invention is that the protective covering or blanket thus provided shall include therein hollow core soluble or disintegratable filaments, yarns or fibers formed from soluble cellulosic derivative material and which are filled with a fluid material selected from the group consisting of fertilizers, pesticides and weed killers and which have walls rupturable and disintegratable by a biochemical reaction caused by micro-organisms in the ground when the yarns are placed on the ground in contact with the soil so as to release at a predetermined time the fluids in the yarns for contact of the fluids with the ground. Use is made of this feature of the invention to thus release the covering effect of the mat, blanket or covering in predetermined portions thereof in order that vegetation previously planted in the soil either during or prior to the applying of the erosion protective covering thereover may germinate and grow through the thus provided openings in the covering and thereby effect the establishment of a soil erosion preventing vegetation covering. Thus a very important feature of this invention is that the protective soil erosion preventing covering will also protect germinating vegetation to enable it to obtain proper growth to thereby establish a protective vegetation crop upon the soil area subject to erosion and which will supersede the protective covering or blanket.

It is to be understood that the protective covering of this invention may have the dissolvable portions thereof disposed in any desired manner throughout the covering. This includes establishment of regularly spaced areas of relatively rapidly dissolving portions of the covering so as to produce a pattern as for example a checkerboard effect, through which vegetation may germinate and grow. It further includes, however, the provision of either regularly or irregularly spaced soluble filaments, yarns or fibers throughout the fabric and in the case of woven textile fabrics of either the warp threads, the woof threads or both.

A third essential basic feature of the invention consists in forming into the covering as all or as a portion thereof soluble and disintegratable filaments, yarns, fibers and the like as hollow or tubular members having chambers thereing receiving various materials which will be thus protected until they are released to the soil by the dissolving of the soluble material. Thus, various agents such as fertilizer for nourishing the soil, insect killers, weed killers or any other desirable treating agents may be confined in the hollow filament or yarns of the covering to be protected thereby until they are released to the soil at a predetermined time.

It will thus be appreciated that the invention contemplates the use of soluble hollow yarns, filaments or fibers having different rates of solubility under conditions causing disintegration to the end that there may be a properly timed interval for the release of the various materials such as seeds, fertilizers, insect killers, weed killers, and the like to enable them to be released at time intervals with respect to each other such as to produce the most effective result.

The invention further includes not only the forming of a covering by providing a woven textile fabric, but also, the forming of a mat-like material of a more or less loosely arranged mass of fibers, yarns, filaments and the like. In addition, it further contemplates the forming of a protective covering or mat by means of a substantially one-piece construction of a molded mat-like body which shall consist in whole or in various parts of a soluble material. To this end, the body may include a plurality of tubular or hollow filaments, yarns, or fibers of a soluble cellulosic derivative material, embedded in and connected together as by a membrane of a disintegratable material. Obviously, in accordance with the preceding explanation, soluble hollow tubular members may be provided of cellulose or other soluble plastics and having different rates of solubility under the same conditions for the aforesaid purposes.

Finally, the invention may be embodied in a mat-like body having molded chambers therein in two or more layers if desired, and containing the various agents to be subsequently released to the soil.

Referring now to the accompanying drawings, by way of illustrating a practical manner of carrying out the invention it will be observed from FIGURE 1 that the numeral 10 designates generally an area of the soil as for example a slope which is subject to erosion and which is desired to protect against such erosion. In accordance with this invention there are placed over selective areas of the soil coverings 12 of disintegratable or soluble materials in accordance with this invention so as to cover any desired region which it is desired to protect against erosion.

In FIGURE 2 it will be observed that the texture of the covering 12 is shown in an exaggeratedly enlarged view. As shown, the covering is in the form of a woven textile fabric having therein warped threads 14 together with weft or filler threads 16. As shown in FIGURE 3, a conventional weave may be employed. Obviously, the invention is applicable to any desired type of weave.

It will be appreciated that any desired yarns or filaments whether warp or weft threads or both, may be woven into the fabric and which may be hollow to contain any of the aforesaid material for subsequent release to the soil and also may be so chosen or so arranged as to have different rates of solubility to thereby release their contents at selected different time intervals.

As shown in FIGURE 6, all of the fillers or weft threads 16 and/or of the warp threads 14 may be tubular so as to contain the different materials and treating agents therein, and these threads may be so woven through the fabric as to produce as shown in FIGURE 4 discrete and separate portions 18 of the fabric having a relatively greater rate of solubility than the remaining portions 20 of the fabric.

As an alternative construction as shown in FIGURE 7, some of the threads or yarns such as the warp threads 14 may be of tubular material containing various agents or material to be released, while other threads such as the weft threads 16 may be solid as a binder material but likewise of a soluble nature.

The core yarns may be extruded, drawn out, molded or fabricated in any fashion in various cross-sectional shapes or to have variously configurated cross-sectional internal areas. A fluid material selected from the group consisting of fertilizers, pesticides and weed killers may be inserted into the hollow core yarn, strand or filament by gravitational flow, by force flow, under pumping means or blowers, or by vacuum means or any other conventional means. In this respect, the essence of the invention does not reside in how the hollow core yarns are filled with a fluid material but in the fact that the hollow core yarns, do in fact, contain a fluid material for particular purposes, as pointed out in the foregoing. The hollow core yarns are filled with the fluid material under a gravitational flow, a force flow by pumping or vacuum means, and the contents of the core yarn are released when the walls of the core yarns are ruptured, broken or disintegrated by a biochemical reaction caused by micro-organisms in the ground. The yarns have walls which are rupturable or disintegratable by biochemcial reaction caused by micro-organisms in the ground when the yarns are placed in the ground in contact with the soil so as to release at a predetermined time the fluids in the yarn for contact of the fluids with the ground.

As a further practical manner of carrying out the principles of the invention, the mat or blanket covering may consist of the tubular warp threads and the tubular weft threads 16, either or both, and which may be either woven together or merely criss-cross on each other and embedded in a web 22 likewise of a soluble material. In the latter there may also be provided pockets or cavities as at 24 in which are received seeds with fertilizer or other soil treating agents being disposed in the hollow chambers within the tubular filaments.

Referring next to FIGURE 5 it will be observed that the covering in the form of a mat 40 may consist of a single piece of material preferably molded to provide a mat-like body and which may be internally divided as by one or more transverse partitions 42 disposed between its top and bottom surfaces 44 and 46 together with separating partitions as at 48 disposed between adjacent partitions 42, 44 and 42, 46. The arrangement is such that there is thus provided a plurality of cavities, chambers or compartments as at 50, 52 which may receive and enclose therein different materials to be released. The material of which the mat 40 is formed is likewise of a water soluble material and the various partitions 42, 44, 46 or 48 may be of different thicknesses in order to vary the rate at which they will dissolve under the influence of weathering.

Various types of soluble material may be employed for the purposes of this invention. By way of example, such materials may be composed of cellulose or cellulosic derivatives such as paper, cotton, rayon, soluble cellulosic esters (methyl cellulose) and blends of cellulose with soluble plastics.

In its simpler forms, the invention may rely solely upon the use of disintegratable materials having a known rate of disintegration under weathering conditons, moisture, whose time of disintegration may be controlled by appropriately varying the thickness or configuration of the material.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention as claimed.

What is claimed as new is as follows:

1. A protective mat for placement on the ground comprising a plurality of elongated hollow core yarns formed from soluble cellulosic derivative material, said yarns being intertwined and spacedly related in an open mesh fashion, each of said yarns being filled with a fluid material selected from the group consisting of fertilizers, pesticides and weed killers and said yarns having walls rupturable and disintegrable by a biochemical reaction caused by micro-organisms in the ground when the yarns are placed on the ground in contact with the soil so as to release at a predetermined time the fluids in the yarn for contact of the fluids with the ground.

2. The invention of claim 1, wherein the yarns are intertwined in a crossed relationship with some of the yarns being warp yarns and some of the yarns being weft yarns.

3. The invention of claim 1, wherein the hollow core yarns are disposed in parallel relationship and are intertwined by weft yarns of a solid binding soluble material.

4. The invention of claim 1, wherein the yarns have walls of different thicknesses to vary the rate at which the walls will rupture and disintegrate by the biochemical reaction caused by micro-organisms in the ground.

5. In a protective covering for placement on the ground, a hollow core yarn formed from soluble cellulosic derivative material, said yarn being filled with a fluid for treatment of the ground and said yarn having a wall structure rupturable and disintegrable by a biochemical reaction caused by microorganisms on the ground when the yarn is placed on the ground in contact with the soil so as to release at a predetermined time the fluid therein for contact of the fluid with the ground.

References Cited by the Examiner

UNITED STATES PATENTS

| | | | |
|---|---|---|---|
| 2,197,594 | 4/1940 | Rowell | 47—56 |
| 2,601,620 | 6/1952 | Marshall | 47—56 X |
| 2,830,404 | 4/1958 | Manning | 47—56 X |
| 2,909,003 | 10/1959 | Marshall | 47—56 |
| 2,976,646 | 3/1961 | Hansen et al | 47—56 |

ABRAHAM G. STONE, *Primary Examiner.*

ROBERT E. BAGWILL, *Examiner.*